(12) United States Patent
Wilkinson

(10) Patent No.: US 6,763,895 B1
(45) Date of Patent: Jul. 20, 2004

(54) CULTIVATING APPARATUS

(75) Inventor: John Raymond Wilkinson, Atherton (AU)

(73) Assignee: Wilkinsons Pty Ltd, Atherton (AU)

( * ) Notice: Subject to any disclaimer, the term of this patent is extended or adjusted under 35 U.S.C. 154(b) by 0 days.

(21) Appl. No.: 10/070,935

(22) PCT Filed: Sep. 6, 2000

(86) PCT No.: PCT/AU00/01054

§ 371 (c)(1),
(2), (4) Date: May 29, 2002

(87) PCT Pub. No.: WO01/17329

PCT Pub. Date: Mar. 15, 2001

(30) Foreign Application Priority Data

Sep. 6, 1999 (AU) .......................................... PQ 2659

(51) Int. Cl.$^7$ .......................... A01B 33/10; A01B 33/12
(52) U.S. Cl. ........................ 172/111; 172/49.5; 172/110
(58) Field of Search .......................... 172/48, 49.5, 51, 172/63, 79, 110, 111, 447, 445.1

(56) References Cited

U.S. PATENT DOCUMENTS

| | | | | |
|---|---|---|---|---|
| 2,755,718 A | * | 7/1956 | Arndt ........................... | 172/42 |
| 2,791,953 A | * | 5/1957 | Erickson et al. .............. | 172/98 |
| 3,667,551 A | * | 6/1972 | van der Lely et al. ..... | 172/49.5 |
| 3,695,361 A | * | 10/1972 | Claas ........................... | 172/67 |
| 4,044,839 A | * | 8/1977 | van der Lely ............. | 172/49.5 |
| 4,051,903 A | * | 10/1977 | van der Lely ................ | 172/47 |
| 4,287,955 A | * | 9/1981 | Anderson ..................... | 172/98 |
| 5,222,563 A | | 6/1993 | Van Horlick ............... | 172/111 |
| 5,944,115 A | * | 8/1999 | Padgett et al. .............. | 172/111 |
| D442,459 S | * | 5/2001 | Wilkinson .................... | D8/98 |
| 2001/0015278 A1 | * | 8/2001 | Pellenc et al. ................ | 172/45 |

FOREIGN PATENT DOCUMENTS

| | | |
|---|---|---|
| AU | 25899/77 | 12/1978 |
| AU | 57509/94 | 2/1995 |

* cited by examiner

Primary Examiner—Thomas B. Will
Assistant Examiner—Alexandra K. Pechhold
(74) Attorney, Agent, or Firm—Fredrikson & Byron, P.A.

(57) ABSTRACT

Soil cultivating apparatus which includes at least one rotary cutting assembly having a plurality of earth working implements (25, 26) spaced around a peripheral region of a rotary support member (18) mounted for rotation about a central upright axis of rotation. The implements (25, 26) depend downwardly from the support member (18) and are in first and second sets. Implements (25) of the first set each have a primary cutting edge extending upwardly, rearwardly and outwardly from a lower soil engaging extremity. Implements (26) of the second set each have a primary cutting edge extending upwardly rearwardly and inwardly from a lower soil engaging extremity. The lower soil engaging extremities of implements (25) of the first set are at a radial distance from the axis less than the radial distance of the extremities of the implements (26) of the second set. The axis of rotation is tilted relative to a forward direction of movement of the apparatus whereby a front region of the member (18) is maintained higher than a rear region thereof.

13 Claims, 10 Drawing Sheets

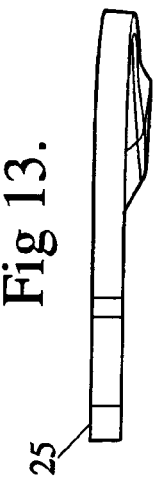
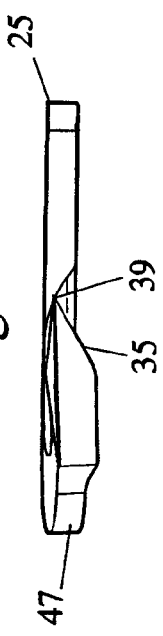
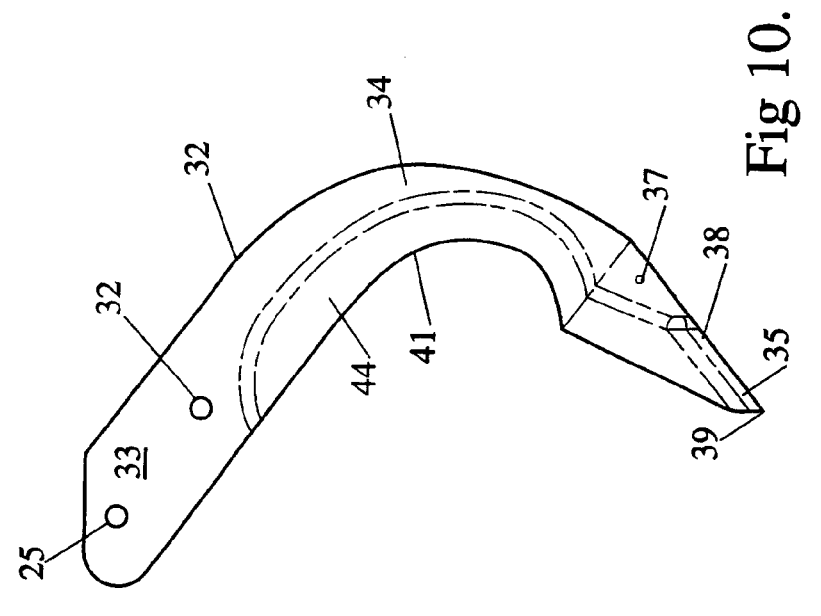
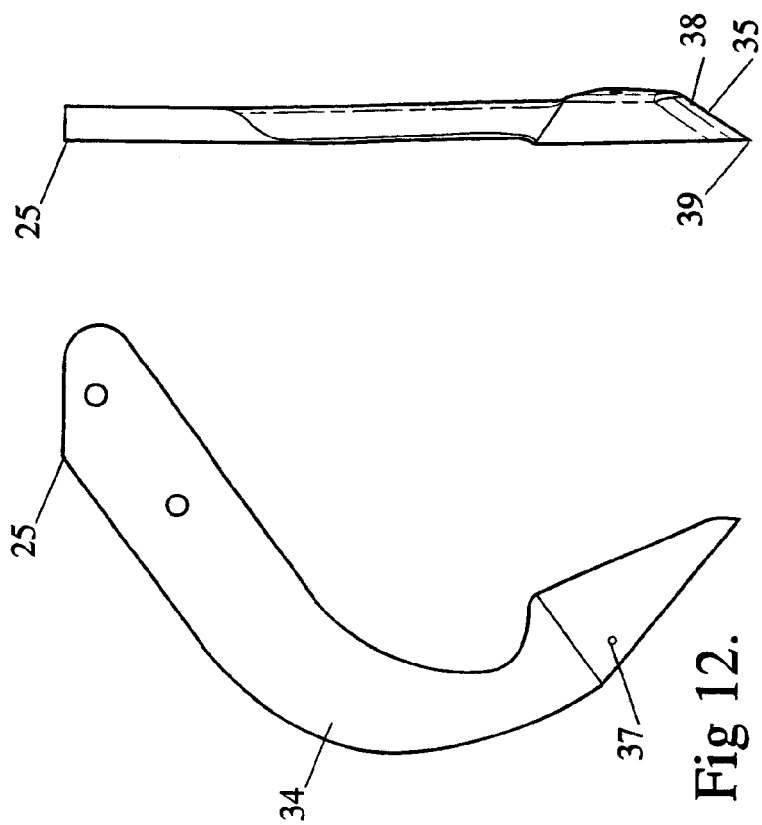

CULTIVATING APPARATUS

TECHNICAL FIELD

The present invention relates to improvements in cultivating implements, particularly for but not limited to crop row cultivation.

BACKGROUND ART

Conventionally, land for crop growing is cultivated, i.e. prepared for planting, by sequential use of various forms of ploughs and harrows often over a period of several weeks or more. Often a farmer may have more than one tractor to use the various implements for preparing land for crop growing. Further, the use of conventional equipment, while being effective to prepare the land cultivated to a certain depth, does often have an adverse effect on the earth beneath the cultivation zone. This lower level earth can become compacted through multiple passes of tractors using such conventional equipment, adversely affecting water flow patterns through the earth and in some cases increasing the likelihood of soil erosion.

A novel form of soil cultivating equipment is disclosed in Australian Petty Patent No. 656509. This specification discloses soil cultivating equipment having a pair of counter rotating discs each being generally horizontal but being higher at the front relative to the rear with respect to the direction of cultivation. Each of the discs has depending earth working blades circumferentially spaced from one another and arranged in sets with the blades of one set being inclined to the direction of rotation of the disc so as to have a forward cutting action and the blades of the second set being oppositely inclined so as to have a backwards cutting action. This specification also discloses the earth working blades of each set being positioned at different distances from the axis of rotation of the disc. It has been found that apparatus constructed in accordance with Australian Petty Patent No. 656509 does not operate satisfactorily as described in the specification.

An objective therefore of the present invention is to provide improved soil cultivation equipment generally of the type disclosed in the aforementioned patent specification but which is effective in operation. Further preferred objectives include providing soil cultivation equipment that may fully prepare a soil area for crop or other seedlings in a much quicker time than is possible utilising conventional machinery, and further avoiding the need to use multiple passes with different implements such as ploughs and harrows and of course multiple tractors for using such implements. A particularly preferred objective is to provide soil cultivation apparatus that may be used to prepare soil regions in spaced rows separated by uncultivated land zones (that is, so-called minimum tillage equipment) whereby only the land region required for crop growing is cultivated rather than the whole area of land. This is particularly useful for such crops as sugar cane but could of course be used in many other applications.

DISCLOSURE OF INVENTION

Accordingly, the present invention provides soil cultivating apparatus including a frame supporting at least one rotary cutting assembly having a plurality of earth working implements spaced around a peripheral region of a rotary support member mounted for rotation about a central upright axis of rotation, each said earth working implement being downwardly depending from said support member and having a primary cutting edge extending upwardly and rearwardly from a lower soil engaging extremity thereof, said earth working implements being arranged in separate sets where the primary cutting edge of each said earth working implement of a first said set also extends outwardly relative to a circumferential line traversed by the lower soil engaging extremity of the earth working implements of said first set, and in a second said set of the earth working implements, the primary cutting edge also extends radially inwardly relative to a circumferential line traversed by the lower soil engaging extremity of the earth working implements of said second set, the lower soil engaging extremity of the primary cutting edges of the earth working implements of the second said set being located at a radial distance from the central upright axis greater than the radial distance of the lower soil engaging extremity of the primary cutting edges of the earth working implements of said first set, said central axis of rotation being tilted relative to a forward direction of movement of the soil cultivating apparatus whereby a front region of the rotary support member is always maintained at a level higher than a rear region of the rotary support member.

Further preferred aspects and features of this invention are as defined in the claims annexed hereto which are incorporated in this disclosure by this reference thereto.

Soil cultivation apparatus according to this invention and/or preferred aspects thereof enable soil areas to be cultivated ready for crop planting with one pass of the apparatus even if the soil area had not previously undergone any form of preparatory work. Accordingly, the long periods of time for ground preparation using multiple passes of different implements such as ploughs, harrows and the like are no longer required. Further, the variation of different implements such as ploughs and harrows are also no longer required.

Still further, since the cultivation intensely works the earth or soil to a required depth but not below this depth, the ground conditions below the cultivation zone remain substantially unaffected by the cultivation process.

BRIEF DESCRIPTION OF DRAWINGS

FIG. 10 is an outer side elevation of the implement shown in FIG. 9 taken in the direction of arrow "C" in FIG. 9.

FIG. 11 is a front view of the implement shown in FIG. 9.

FIG. 12 is an inner side elevation of the implement shown in FIG. 9.

FIG. 13 is a view from above of the implement shown in FIG. 9.

FIG. 14 is a view from below of the implement shown in FIG. 9.

BEST MODE FOR CARRYING OUT THE INVENTION

There is described below a cultivating apparatus according to the invention which is adapted to be mounted on a conventional three-point hitch of a tractor and driven from a Power Take Off shaft provided at the rear of the tractor and driven through a transmission by the tractor engine, as is known in the art. The apparatus is suitable for cultivating two strips, spaced apart laterally with respect to forward travel direction of the tractor. However, it is to be understood that apparatus within the scope of the invention may also be constructed to cultivate a single strip only, or more than two strips. The two-strip version here described is simply chosen by way of example.

Figure 1:
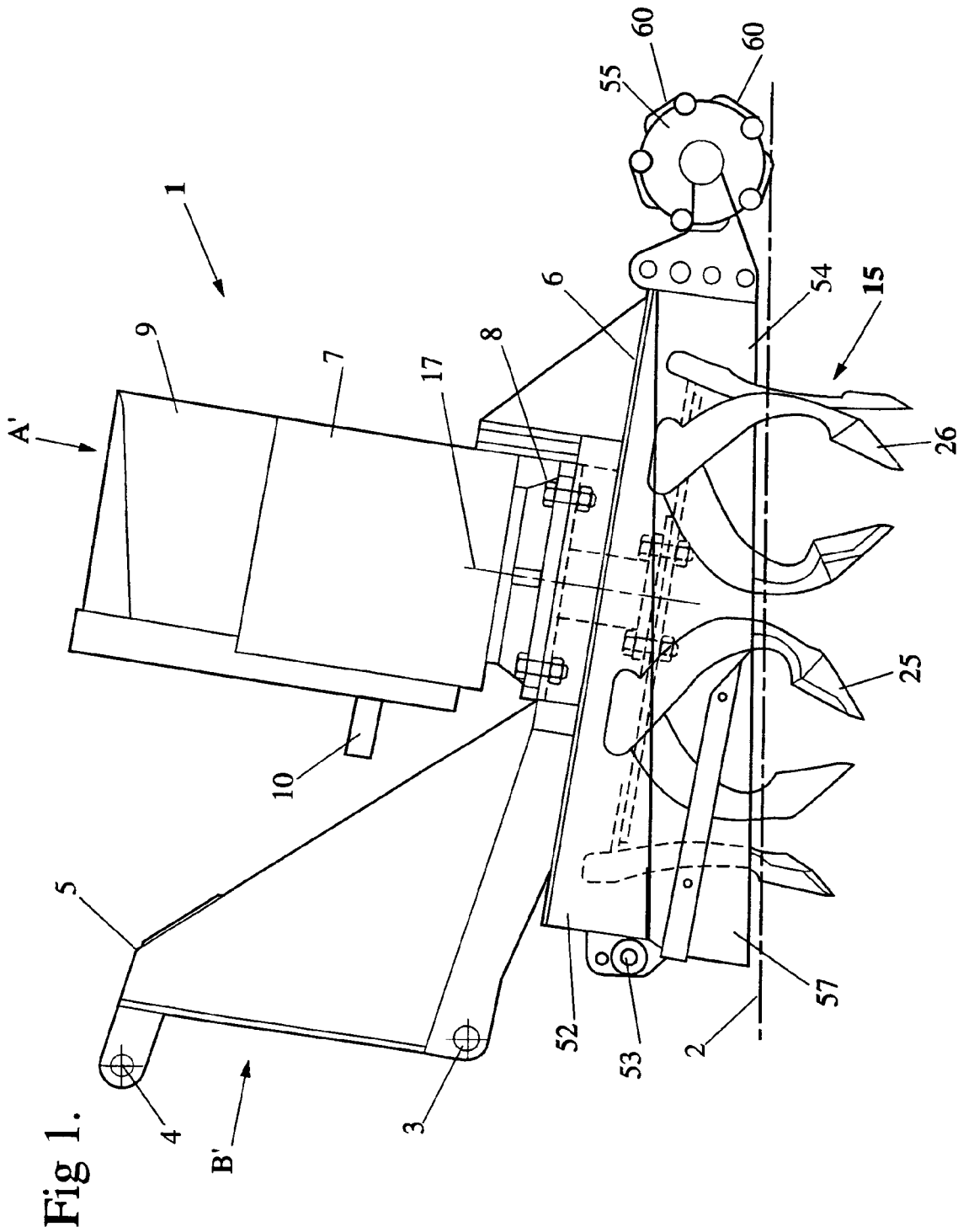
FIG. 1 is a side view of a two-row cultivating apparatus according to the invention.

FIG. 1 shows a side view of the cultivating apparatus 1, together with a line representing a ground surface 2 over which the apparatus 1 is passed when in operation. As seen in FIG. 1, the apparatus 1 is intended to be drawn in a forward direction from right to left.

Figure 2:
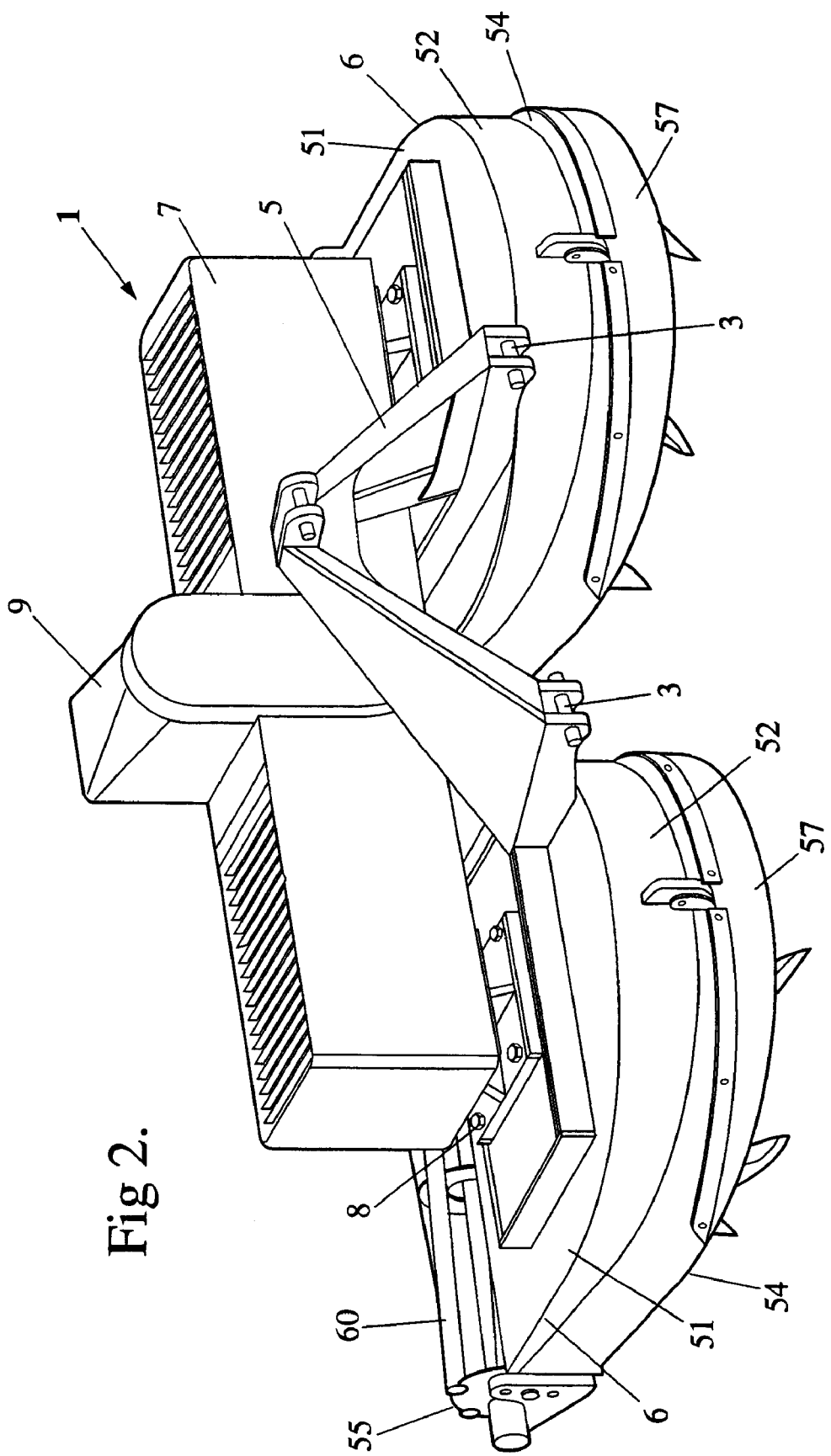
FIG. 2 is a perspective view of the cultivating apparatus shown in FIG. 1.
Figure 3:
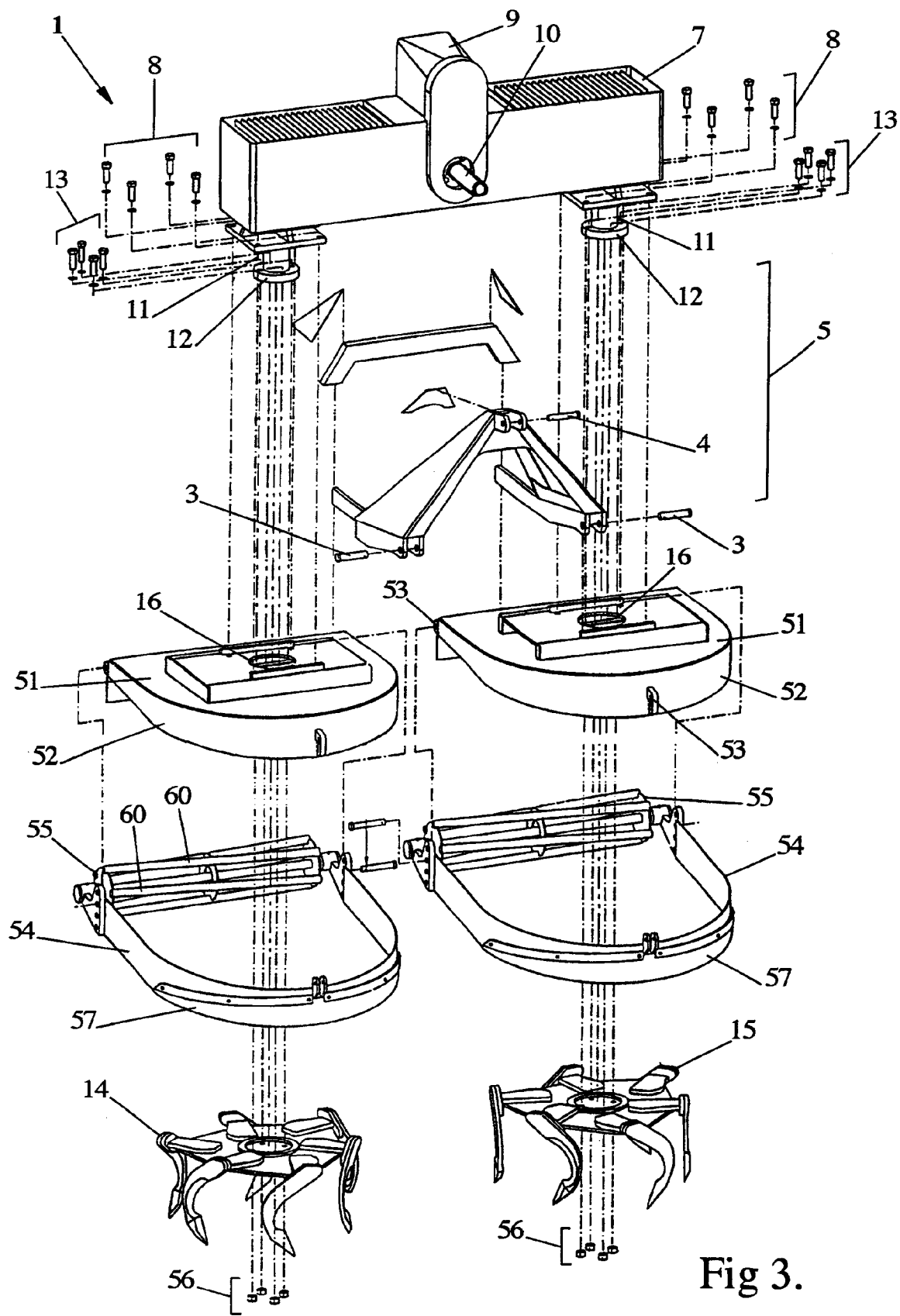
FIG. 3 is an exploded perspective view of the apparatus shown in FIG. 1.
Figure 4:
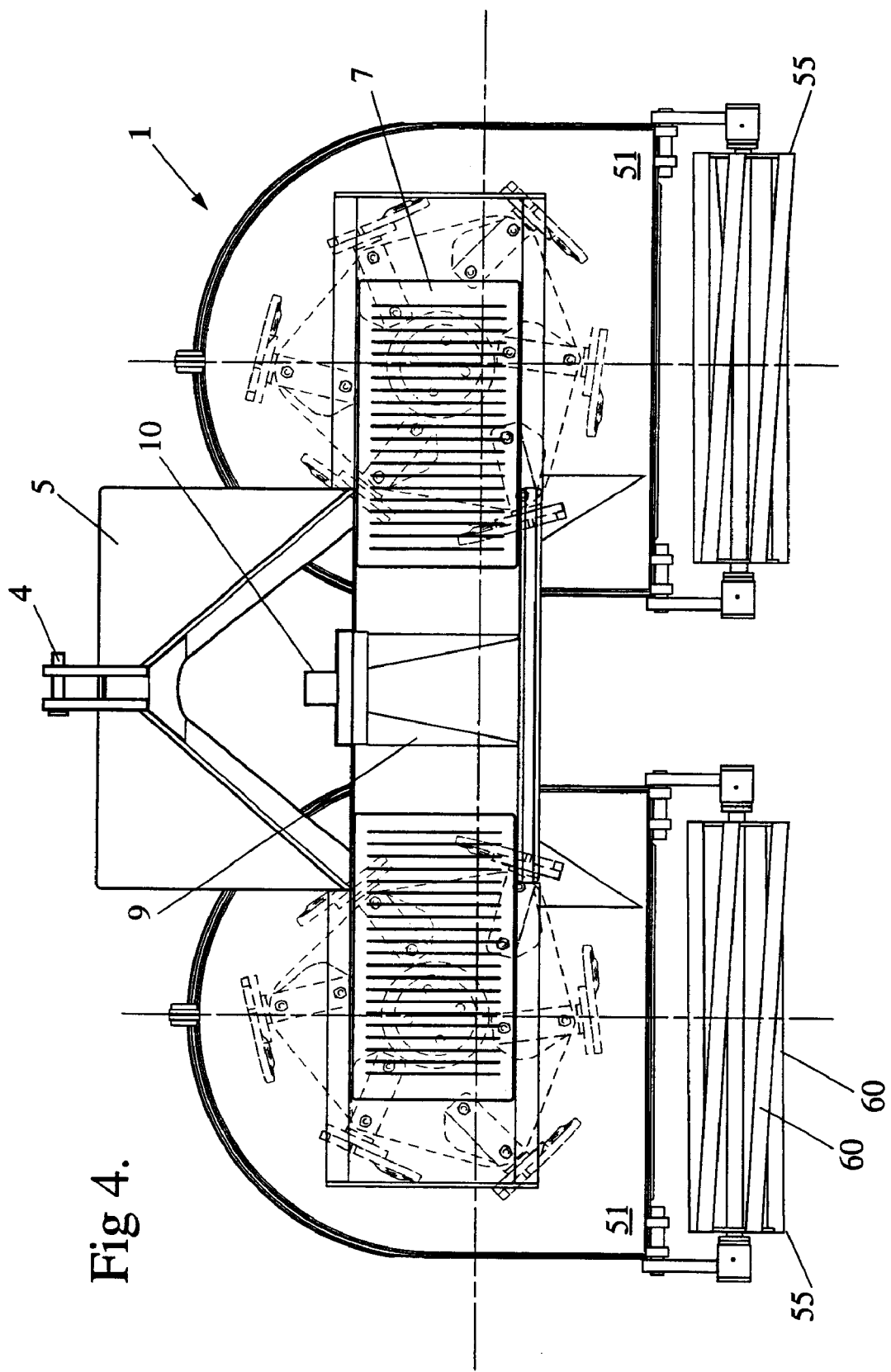
FIG. 4 is a view of the apparatus shown in FIG. 1, taken in the direction of arrow "A" in FIG. 1.
Figure 5:
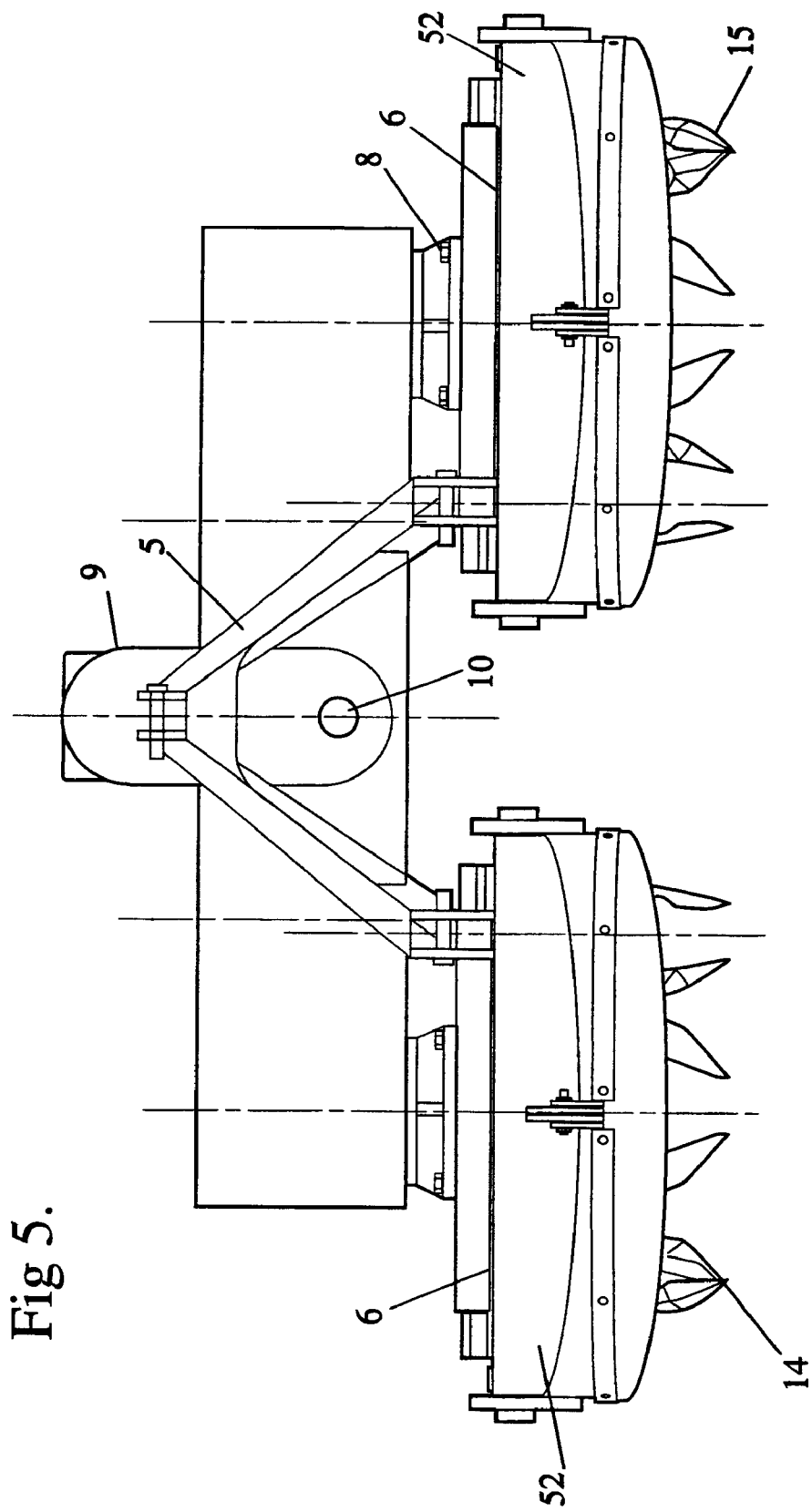
FIG. 5 is a view of the apparatus shown in FIG. 1, taken in the direction of arrow "B" in FIG. 1.

FIG. 2 shows the apparatus 1 in perspective view from a position slightly ahead and to its right side. FIG. 3 shows the apparatus in exploded perspective view. The tractor pulling the apparatus 1 is not shown in the Figures.

The apparatus 1 includes two lower mounting pins 3 and one upper mounting pin 4 on a hitch structure 5, pins 3 and 4 being adapted for connection to co-operating links (not shown) of a standard linkage of the type provided on most tractors intended for agricultural use, and generally known as a "three point hitch". By means of such a hitch, the mounting pins 3 and 4, and with them the apparatus 1, may be lowered and raised and the apparatus 1 tilted, as required by the tractor operator to engage with and disengage from the ground surface 2 and orient the apparatus 1 correctly relative to ground surface 2. Such tilting is within an upright plane (not shown) containing the direction of tractor travel.

The hitch structure 5 is secured to left and right base assemblies 6. A transverse structure 7 is bolted to left and right base assemblies 6 by bolts 8. At the centre of the transverse structure 7 is a gearbox 9. The gearbox 9 has a forwardly extending input shaft 10 adapted and suitably positioned for coupling by via an intermediate shaft and universal joints (not shown) to a standard power-take-off shaft (not shown) at the rear of the tractor. Such an arrangement is well-known and standardized as a means of providing mechanical drive from a tractor to an apparatus mounted on a three-point hitch, and so need not be described further here, save to say that the input shaft 10 is driven, when the apparatus 1 is in use, by the tractor's engine, and that this driving is not affected by raising and lowering of the three-point hitch.

As best seen in FIG. 3, left and right output shafts 11 are journalled within, and extend downwardly from, each end of the structure 7. Each has a mounting flange 12 which in turn is bolted by bolts 13 and nuts 56 to one of two rotary cutting assemblies 14 and 15. The shafts 11 pass through openings 16 in base assemblies 6.

Within the gearbox 9 and the structure 7 there is provided a drive train (not shown) which converts rotation of the shaft 10 to rotation in opposing directions (to each other) of the two shafts 11. The drive train is adapted to reduce the rotational speed of the shaft 10 to a speed suitable for the rotary cutting assemblies 14 and 15. In practice, it has been found that satisfactory operation of the apparatus 1 is secured when the speed of the assemblies 14 and 15 is in the range 170 rpm to 210 rpm (variable by the tractor's throttle setting), but other speeds may be found suitable in specific conditions. The details of the drive train need not be given here, as such drive trains are commonly used in agricultural and similar machinery, and their design is well established and known to persons skilled in the art.

Each of the base assemblies 6 is a cover for one of the rotary cutting assemblies 14 or 15 and has a top plate 51 and a skirt 52 depending therefrom. These limit undesired throwing of soil and dust from the cultivated area, and, for safety, prevent accidental access to the rotary cutting assemblies 14 and 15. Pinned to each base assembly 6 at points 53 is a lower skirt assembly 54, which extends the skirt 52 downward. As best seen in FIG. 1, the lower skirt assemblies 54 are shaped so that their lower edges lie in a plane parallel to the ground surface 2 when the apparatus 1 is in use. Each lower skirt assembly 54 includes a flexible section (e.g. of rubber) 57 at its front, which helps avoid large drag forces if a lower skirt assembly 54 happens to contact the ground, and has also been found, surprisingly, to limit any tendency for excessive ground material to build up ahead of the apparatus 1 when working on grassed areas. Secured to each lower skirt assembly at the rear of apparatus 1 is a roller assembly 55, which is journalled to rotate freely as it contacts the ground in use of the apparatus 1. Each roller assembly 55 is of adjustable height relative to its respective base assembly 6, and has elongate members 60 which in use apply slight corrugations to the cultivated surface to facilitate retention of rainwater. In addition, the rollers 55 provide additional support for, the apparatus 1 and enhance its stability.

In use of the apparatus 1, the right and left rotary cutting assemblies 14 and 15, respectively, engage the ground surface 2, while the right assembly 14 rotates counter-clockwise (when seen from above) and the left assembly 15 rotates clockwise (when seen from above). As best seen in FIG. 1, in which there is shown an axis 17 of rotation of the left shaft 11 and left rotary cutting assembly 15, the axis of rotation 17 is held, in a normal operating position of apparatus 1, at a small angle from the vertical, so that any part of the assembly 15 is lower when rotated to its rearmost position than when rotated to its most forward position. The same applies to the right assembly 14 and its shaft 11. The angle to the vertical of the axis 17 may be varied to suit ground type and conditions and is in the apparatus 1 set at 8°. This angle is preferably in the range 5° to 20°.

Figure 6:
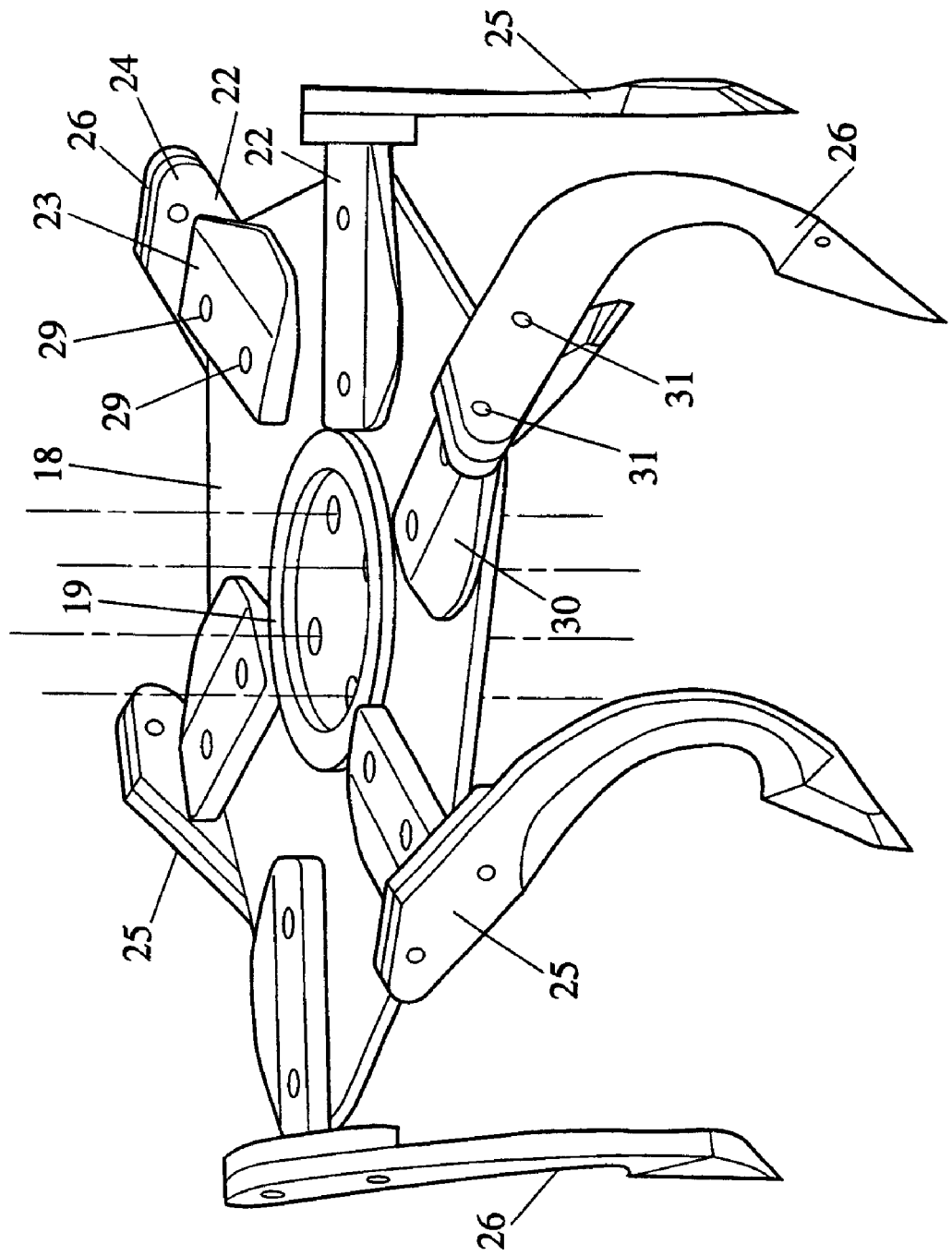
FIG. 6 is a perspective view of a rotary cutting assembly from the apparatus shown in FIG. 1.
Figure 7:
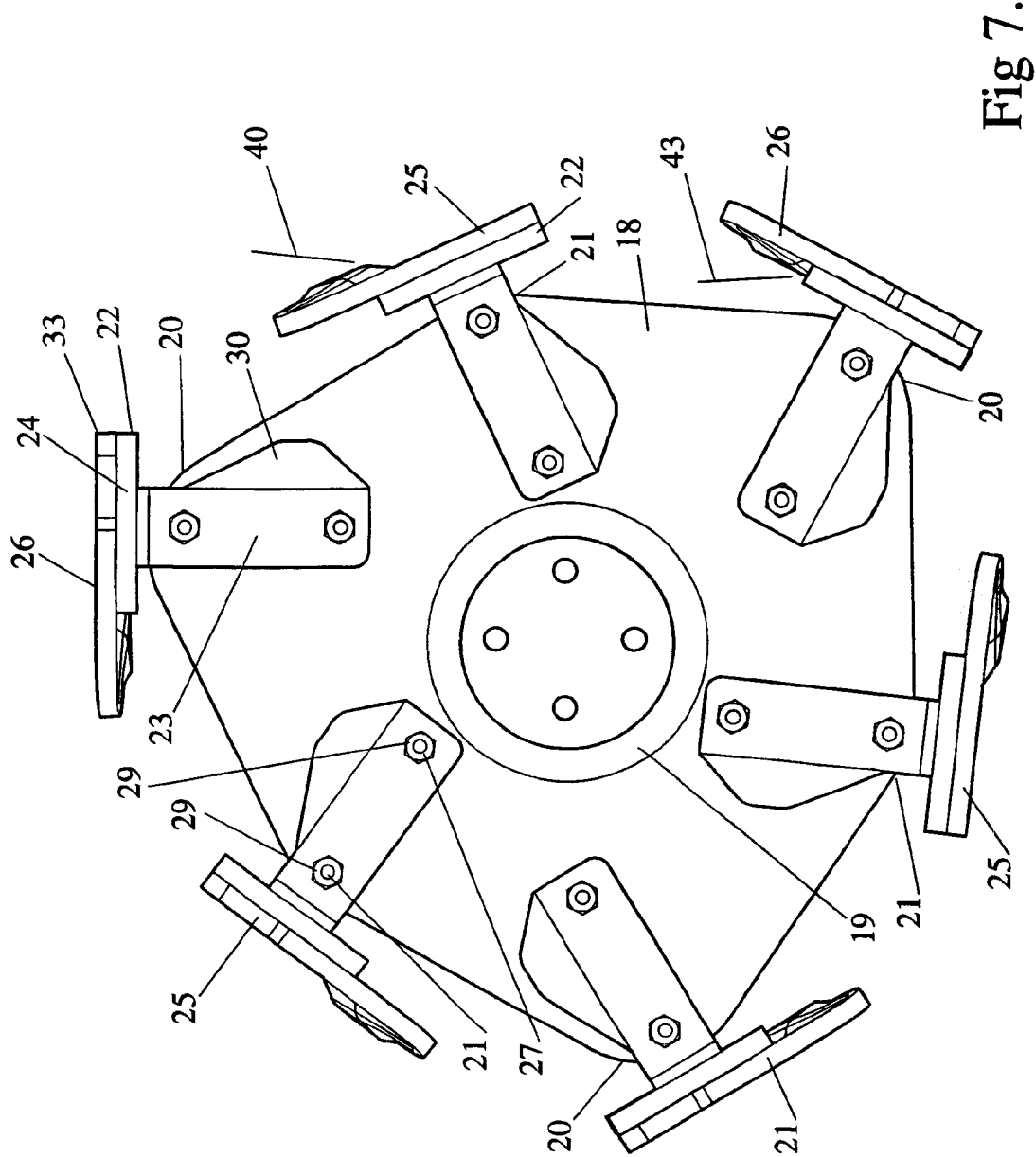
FIG. 7 is an axial end view of the rotary cutting assembly shown in FIG. 6 as seen from above.

FIGS. 6 and 7, particularly, show a preferred form of the left rotary cutting assembly 15. The right assembly 14 is of opposite hand but otherwise the same, so that only the left assembly 15 will be described in detail. The assembly 15 includes a plate 18 of irregular hexagon shape having a central ring 19 secured thereto (for example by welding) and into which the left mounting flange 12 is received to locate the plate 18 relative to the flange 12.

The plate 18 has six corners with three corners 20 being radially further from the axis of rotation 17 than the remaining three corners 21, and corners 20 and 21 alternating around the periphery of plate 18. An implement holder 22 is bolted to the plate 18 at each of the corners 20 and 21, each holder 22 having a first plate portion 23 bolted to the plate 18 and a second upright plate portion 24 welded to a radially outer end of the first plate portion 23. The same design of holder 22 is used for implements 25 and 26. All implements 25 on assembly 15 are mounted at one radius from axis 17, and all implements 26 on assembly 15 are mounted at another, larger, radius. Each implement 25 on the assembly 15 lies peripherally between two implements 26. The three implements 25 form a first, innermost, set of implements, and the implements 26 form a second, outermost, set of implements.

The upright plate portion 24 of holder 22 is adapted to allow an upper end of either of two types of earth working implement 25 and 26 to be bolted thereto. Two spaced-apart threaded bolts 27 are provided connecting the plate portion 23 of each holder 22 to the plate 18 and similarly two spaced-apart threaded bolts 28 connect each of the earth working implements 25 and 26 to their respective upright plate portions 24. The lower one of each pair of bolts 28 is of smaller diameter than, and therefore designed to fail before, the upper one, so as to allow the corresponding earth working implement 25 or 26 to rotate about the upper bolt 28 should the corresponding implement 25 or 26 hit an immovable obstruction (such as a large rock) during operation of the apparatus 1. Further, the drive train may include one or more shear pins or other weak links designed to fail when excessive resisting torque is experienced by either of the assemblies 14 or 15 rather than to allow the affected assembly 14 or 15 to be destroyed in such circumstances.

The plate portion 23 of each implement holder 22 has a pair of bolt holes 29 that correspond with similar holes (not shown) in the plate 18 to suitably orientate the earth working implement 25 or 26 to be attached to the holder 22. Nuts mating with bolts 27 are recessed in hexagonal recesses in the plate section 23 to minimise any obstruction and protect the heads from earth material contact during operation, and so that the bolts 27 can be tightened with a single spanner. Similarly the plate portion 23 has on its forward side a tapered wedge shaped formation 30 which eases the passage of any earth material past the holder 22 during use by displacing the earth slightly upward. The upright plate portion 24 also includes a pair of bolt holes 31 similarly formed to the bolt holes 29, i.e. for recessing of nuts mating with bolts 28, but adapted to match holes 32 on the upper section of the earth working implements 25 and 26.

FIGS. 9 to 14 show one of the two implement types, namely implement 25. As will be clear from FIGS. 6 and 7, implements 25 are secured to holders 22 at the corners 21 of the plate 18, i.e. those of lesser radius than corners 20.

Each earth working implement 25 includes an upper attachment end 33, a downwardly depending support arm 34 and a primary cuffing edge 35 located at a lower end thereof. The primary cuffing edge 35 is conveniently formed on a replaceable boot part 36 that may be releasably fixed to the support arm 34 via a fixing pin 37 or the like. Each primary cutting edge 35 has a chisel-like surface 38 extending upwardly therefrom. The primary cutting edge 35, in use, extends upwardly, rearwardly and outwardly from a lower extremity (preferably a point) 39 of the implement 25—see FIG. 7 which shows a line 40 drawn as an extension of the primary cutting edge 35. The foregoing "directions" of the primary cutting edges 35 are relative to the forward direction of rotation of assembly 15 and to a circumferential line traversed by the lower extremity 39 of the implement 25 as assembly 15 rotates. As will be further apparent from FIGS. 9 to 14, the support arm 34 is curved so as to present a concave side to the forward direction of rotation of the assembly 15. The support arm 34 preferably has a chisel surface 44 on one side so that there is a secondary cutting edge 41 extending downwardly towards the lower extremity of the support arm 34. As best seen in FIGS. 13 and 14, the support arm 34 is slightly bent in a lateral direction (i.e. with respect to the intended direction of travel of the implement 25 through soil) so that as it traverses its curved path through the soil, the rear of the arm 34 does not drag on one side of the cut made by the secondary cuffing edge 41.

Figure 8:
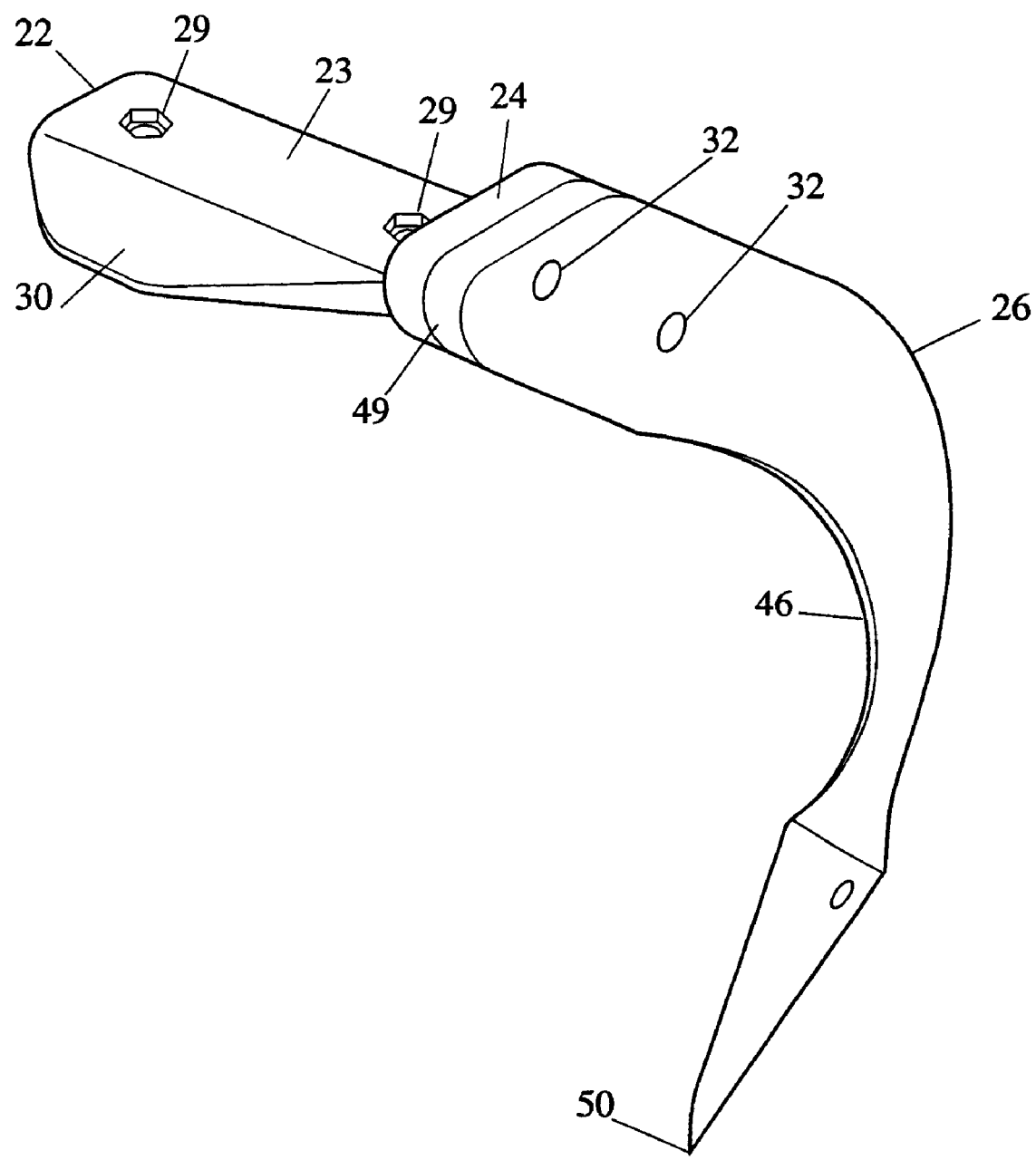
FIG. 8 is a perspective view of an earth working implement, on its mounting bracket, from the assembly shown in FIG. 6.
Figure 9:
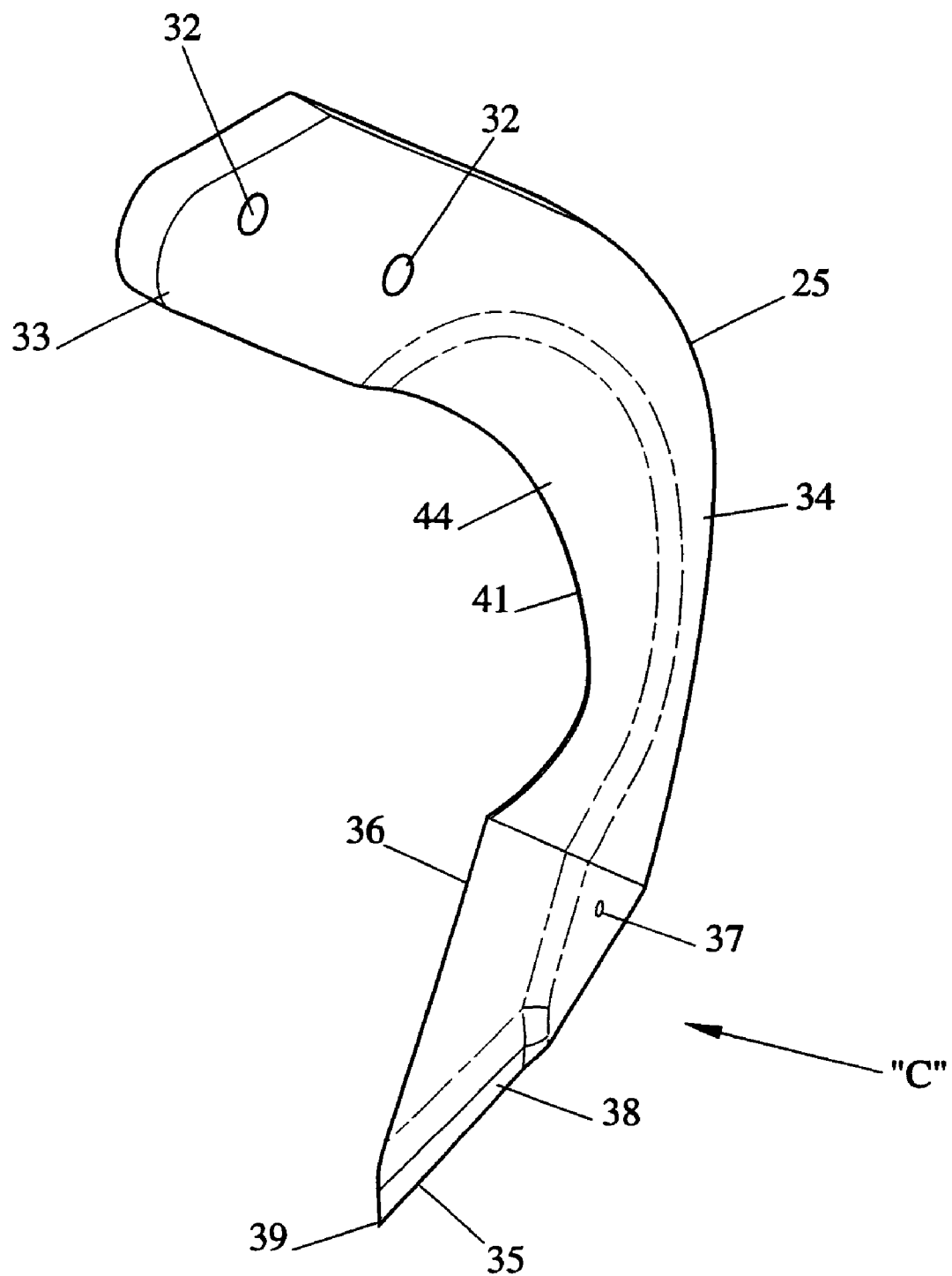
FIG. 9 is a perspective view of a further earth working implement from the assembly shown in FIG. 6.

FIG. 8 shows the other of the two types of earth working implements, namely implement 26, on a holder 22. Implement 26 is in every respect a mirror image of implement 25 in the sense that an implement 25 and an implement 26, could in principle be connected by a bolt through their respective upper holes 32 and a bolt through their respective lower holes 32 and there would then be a plane of symmetry midway between the connected implements 25 and 26. (Such an arrangement would be of no practical significance, but illustrates in a simple way the opposite handedness of implements 25 and 26.) As will be clear from FIGS. 6 and 7, implements 26 are secured to holders 22 at the corners 20 of the plate 18, i.e. those of greater radius than corners 21. Each implement 26 has a primary cutting edge 42 corresponding to edge 35 of each implement 25 and which, when mounted to the assembly 15, extends upwardly, rearwardly and inwardly. This is illustrated in FIG. 7 by a line 43 drawn as an extension of the primary cutting edge 42 of an implement 26. The chisel surfaces 44 of implements 25 of assembly 15 extend rearwardly from the secondary cutting edges 41 and face outwardly. Chisel surfaces 45 of implements 26 of assembly 15 correspond chisel surfaces 44 of implements 25 and extend rearwardly from secondary cutting edges 46 and face inwardly.

The combined effect of forward movement of the apparatus 1 and rotation of the rotary cutting assemblies 14 and 15 is that the earth working implements bring about a high level of soil disturbance and working. By ordinary trial and error, a satisfactory combination of forward speed, rotation speed can normally be found for a given soil condition.

The shape of the support arms 34 and the secondary cutting edge 41 tends to draw down vegetation (not shown) on the ground surface 2 and chop it during rotation of the assembly 15. The implements 26 tend to act in the same way, and such vegetation may be quite finely separated and distributed throughout the cultivated soil. Rear faces 47 and 48 of implements 25 and 26 respectively are substantially flat.

The eccentric arrangement of holders 22 on plate 18, shown in FIG. 7, allows for the differing radii of implements 25 and 26 and for the fact that the upper attachment ends 33 of implements 25 and corresponding upper attachment ends 49 of implements 26 are by design peripherally ahead of their respective points 39 and 50. However, it will be noted that points 39 and 50 are substantially equispaced around the periphery of assembly 15.

An important consequence of the fact that implements 25 and 26 are mirror images of each other is that only these two implement patterns are required for construction of handed pairs of rotary cutting assemblies, such as 14 and 15. Specifically, an implement 25 can be used as one of the smaller-radius implements on left assembly 15 or as one of the larger-radius implements on the right rotary cutting assembly 14, and an implement 26 can be used as one of the larger-radius implements on left assembly 15 or as one of the smaller-radius implements on the right rotary cutting assembly 14.

It will be appreciated that reaction torques applied by the earth to the two rotary cutting assemblies 14 and 15 will tend at least approximately to balance each other out. For this reason, in cultivating apparatus according to the invention which have multiple rotary cutting assemblies, it is preferred that the number of such assemblies be an even number, divided into pairs of contra-rotating assemblies.

What is claimed is:

1. Soil cultivating apparatus including a frame supporting at least one rotary cutting assembly having a plurality of earth working implements spaced around a peripheral region of a rotary support member mounted for rotation about a central upright axis of rotation, each said earth working implement being downwardly depending from said support member and having a primary cutting edge extending upwardly and rearwardly from a lower soil engaging extremity thereof, said earth working implements being arranged in separate sets where the primary cutting edge of each said earth working implement of a first said set also extends outwardly relative to a circumferential line traversed by the lower soil engaging extremity of the earth working implements of said first set, and in a second said set of earth working implements, the primary cutting edge also extends radially inwardly relative to a circumferential line traversed by the lower soil engaging extremity of the primary cutting edges of the earth working implements of the second said set being located at a radial distance from the central upright axis greater than the radial distance of the lower soil engaging extremity of the primary cutting edges of the earth working implements of said first set, said central axis of rotation being tilted relative to a forward direction of movement of the soil cultivating apparatus whereby a front region of the rotary support member is always maintained at a level higher than a rear region of the rotary support member.

2. Soil cultivating apparatus according to claim 1, wherein a chisel surface extends upwardly and rearwardly from each said primary cutting edge.

3. Soil cultivating apparatus according to claim 1 or claim 2, wherein the lower soil engaging extremity of each said earth working implement is a point.

4. Soil cultivating apparatus according to claim 1 or claim 2, wherein each said earth working implement includes a support arm extending downwardly from said rotary support member to said primary cutting edge, said support arm being curved when viewed radially presenting a concave side forwardly relative to the direction of rotation of said rotary support member about said central upright axis.

5. Soil cultivating apparatus according to claim 4, wherein said support arm includes a secondary cutting edge along at least part of its length, said secondary cutting edge having a surface extending rearwardly and outwardly therefrom when the earth working implement is one of said first set and rearwardly and inwardly when the earth working implement is one of the second set.

6. Soil cultivating apparatus according to claim 5, wherein the support arm of each said second set of earth working implements is curved when viewed from above so that a concave side thereof faces radially inward.

7. Soil cultivating apparatus according to claim 5, wherein the support arm of each said first set of earth working implements is curved when viewed from above so that a concave side thereof faces radially outward.

8. Soil cultivating apparatus according to claim 1 or claim 2, wherein the earth working implements of said first and second sets are arranged in adjacent pairs.

9. Soil cultivating apparatus according to claim 8, wherein there is three earth working implements in each of said first and second sets.

10. Soil cultivating apparatus according to claim 1 or claim 2, wherein the rotary support member is arranged to rotate at a speed between 170 and 210 rpm.

11. Soil cultivating apparatus according to claim 1 or claim 2, wherein the central upright axis of rotation is tilted from the vertical by 5° to 20°, preferably 8°.

12. Soil cultivating apparatus according to claim 1 or claim 2, wherein each working implement of said first set is a mirror image of an earth working implement of said second set.

13. Soil cultivating apparatus according to claim 1 or claim 2, wherein there is provided at least two said rotary support member transversely spaced relative to one another and arranged to rotate in opposite directions.

* * * * *